United States Patent
Ebbes et al.

(10) Patent No.: US 8,296,368 B2
(45) Date of Patent: Oct. 23, 2012

(54) METHOD AND PROGRAM FOR PROVIDING DATA COHERENCE IN NETWORKS

(75) Inventors: Alexander Ebbes, Nieder-Olm (DE); Bernd Reifenhäuser, Mainz (DE)

(73) Assignee: GIP AG, Mainz (DE)

( * ) Notice: Subject to any disclaimer, the term of this patent is extended or adjusted under 35 U.S.C. 154(b) by 87 days.

(21) Appl. No.: 12/876,982

(22) Filed: Sep. 7, 2010

(65) Prior Publication Data

US 2011/0082904 A1   Apr. 7, 2011

Related U.S. Application Data

(63) Continuation of application No. PCT/EP2009/052418, filed on Feb. 27, 2009.

(30) Foreign Application Priority Data

Mar. 6, 2008   (DE) .......................... 10 2008 012 979

(51) Int. Cl.
*G06F 15/16* (2006.01)
(52) U.S. Cl. ........ 709/205; 709/230; 709/231; 709/212; 709/214; 709/216
(58) Field of Classification Search .................. 709/205, 709/230, 231, 212, 214, 216
See application file for complete search history.

(56) References Cited

U.S. PATENT DOCUMENTS

| | | | |
|---|---|---|---|
| 6,917,967 B2* | 7/2005 | Wu et al. ........................ | 709/213 |
| 2003/0028695 A1 | 2/2003 | Burns et al. | |
| 2007/0113022 A1* | 5/2007 | Abraham et al. .............. | 711/144 |
| 2007/0294485 A1* | 12/2007 | Zeffer et al. ................... | 711/141 |
| 2010/0121961 A1* | 5/2010 | Elleuch et al. ................ | 709/228 |

OTHER PUBLICATIONS

International Search Report (Sep. 1, 2009, 2 pages).

* cited by examiner

*Primary Examiner* — Lan-Dai T Truong
(74) *Attorney, Agent, or Firm* — The Maxham Firm (57) ABSTRACT

A method of and a program for providing coherence between instances of data objects residing on distributed nodes of a non-memory-coupled network. To provide a method of and a program for providing coherence in accordance with the features set forth in the opening part of this specification, which allows coherence between, in principle, any data objects or instances of data objects, in that respect is substantially freely scalable and also does not require a central memory or server for the data objects. In accordance with embodiments of the invention, for each instance of a data object that is processed by a node, platform-independent unique metadata are generated and by means of the metadata and a coherence protocol which operates on that metadata, the metadata and thus the data objects are kept coherent.

33 Claims, 6 Drawing Sheets

BLOCK DIAGRAM OF A NETWORK WITH COHERENCE AGENT AND COHERENCE NODE (WITH COHERENCE NODE ON LOCAL COMPUTER)

BLOCK DIAGRAM OF A NETWORK WITH
COHERENCE AGENT AND COHERENCE NODE
(WITH COHERENCE NODE ON LOCAL COMPUTER)

FIG. 3

BLOCK DIAGRAM OF A NETWORK WITH COHERENCE AGENT AND COHERENCE NODE (WITH NET-SIDE COHERENCE NODE)

FIG. 4

BLOCK DIAGRAM OF THE INTERNAL STRUCTURE OF A COHERENCE NODE WITH ITS INTERFACES TO THE COHERENCE AGENT AND THE COHERENCE NET

FIG. 5

THE METHODS AND PARAMETERS OF A COHERENCE AGENT

FIG. 6

THE NET INTERFACE OF THE COHERENCE NODE IN AN EMBODIMENT INVOLVING SIP

FIG. 7

BLOCK DIAGRAM OF THE COHERENCE CACHE OF A COHERENCE NODE

FIG. 8

METHOD AND PROGRAM FOR PROVIDING DATA COHERENCE IN NETWORKS

FIELD OF THE INVENTION

The present invention relates to methods and programs for providing coherence between instances of data objects residing on distributed nodes of a non-memory-coupled network.

BACKGROUND

In particular methods are known in the state of the art for so-called cache coherence on parallel computers, in which a plurality of processors each have a dedicated associated cache memory, and memories and processes are typically connected together by way of a bus. Cache coherence is maintained by monitoring the access to a common memory or at least a common memory address space such as, for example, in the case of a distributed memory, and by association of states determining coherence with individual cache lines. In that respect, for example, the so-called MESI protocol is used. MESI is the abbreviation for modified exclusive shared invalid, wherein each of the aforementioned terms respectively defines an access state of a data object, which in turn affords the respectively most up-to-date version of a cache line, as is generally known to people skilled in the art in this field.

By monitoring the memory access, each processor or each control logic system of a cache memory can establish whether any of the copies of a cache line have been modified or overwritten, which generally has the result that any further copies in other cache memories are deemed invalid, and accordingly they can no longer be accessed. That ensures that each processor only accesses the respectively most up-to-date cache line.

Data objects which are exchanged in non memory-coupled networks and which are held by a plurality of users or nodes, and possibly modified, in contrast, are not present in the form of cache lines, but involve, in principle, any structure which is dependent on hardware and application program. Monitoring of the data traffic, or indeed the local memory accesses, is not viable in practice precisely in the case of large and widely distributed networks such as, for example, in the Internet, between all nodes which are involved in processing a specific data object, so that the methods which are based on cache line coherence and which are known from memory-coupled networks are not to be transferred to such networks.

On the other hand however, there is a considerable need for users who are possibly far away from each other and who are connected together by way of a WAN (wide area net) or the Internet to operate jointly on one and the same, often complex, data object, and for that purpose a respective instance of a data object must be stored on its local node or downloaded. Even computers or nodes connected in the form of an intranet of a relatively large corporate network cannot implement the cache coherence methods or can only implement them with a considerable degree of complication and expenditure, in regard to monitoring data traffic and in a considerably modified form, so that here too there is a need for an improved method of providing data coherence. Many corporations also have distributed sites which are only connected together by way of the Internet, in which case however, users or employees at various sites and possibly also mobile users who connect somewhere on the road by way of the Internet must operate on one and the same data object and for that purpose a respective instance of the data object and, more specifically, the respectively most up-to-date instance, must be loaded.

By way of example it is entirely usual that very extensive documents are partially produced and processed by a plurality of users who are active at locations which are very far away from each other and process the same object, in which respect it is indispensable that the various instances of such a data object are always kept coherent. A corresponding relatively complex document would be, for example, a document which describes and defines an interface agreement.

SUMMARY OF EMBODIMENTS OF THE INVENTION

In consideration of that state of the art outlined above, a purpose of embodiments of the present invention is to provide a method and a program for providing coherence in accordance with the features referred to above, which allow coherence between, in principle, any data objects or instances of data objects, which in that respect is substantially freely scalable and which also does not need any central memory or server for the data objects.

In further regard to the method referred to in the above Background, a purpose of the present invention is attained in that, for each instance of a data object that is processed by a node, platform-independent unique metadata are generated and communicated by way of a coherence protocol at least between all nodes of the network, holding an instance of the respective data object.

It will be appreciated that in that respect, communication does not necessarily have to occur instantaneously so that it may be sufficient if a corresponding communication is effected, at the latest, when a node calls up an instance of the data object in question.

The metadata which are respectively generated in relation to an instance of a document and which are platform-independent and unique (that is to say unique for the instance of the data object) are only of a relatively limited (constantly great) scope even in relation to data objects of any size, and can be communicated without noticeable loading on the network, in which respect the main attention is less on any loading on the network, but is directed primarily to the reduction in coherence traffic between the nodes of the network. In actual fact the metadata also do not have to be completely communicated between the nodes, but in accordance with an embodiment of the invention it is sufficient if state transitions of the state machines as well as the associated operations performed on the data objects (reading, writing, erasing, among others) are communicated at least between all nodes of the network, holding an instance of the respective data object.

The individual involved computers and applications as well as the nodes of a corresponding coherence network therefore require a considerably reduced data traffic and throughput for achieving data object coherence and a correspondingly reduced degree of complication and expenditure in respect of time and computing effort than was hitherto possible for achieving coherence with previously known methods.

In accordance with an embodiment of the invention, each node which calls up the data object in question for processing, or also only for reading, acquires the metadata and thus the information as to which instance is the respectively current one. By virtue of the unique association of the metadata with the respective instances of the object, the node therefore also acquires the up-to-date version of that data object or the details of the address or the storage location of the current instance of the data object and can then furnish that current instance.

In that respect in accordance with an embodiment the metadata contain a state machine corresponding to the coherence protocol. State machines form a part of the metadata, in which any access to a data object is reflected in characteristic fashion. They are therefore particularly suitable for communicating the coherence of data objects.

The common coherence protocol is correctly generated and interpreted independently of the local hardware and software by all nodes which potentially handle the data object, even if the individual nodes may have very different hardware and software components for handling the data objects. Moreover the term handling data objects is used to denote any process which is linked to calling up or storing data objects, that is to say, any demand for reading, possessing, modifying, and writing or storing.

Furthermore in accordance with an embodiment it is provided that the coherence protocol is such that the nodes using the coherence protocol can form an overlay network.

In that respect an embodiment of the invention provides that a service defining the overlay network is provided, which allows a demand and communication of data objects between at least some of the nodes of the overlay network. That service includes the necessary software components for addressing remote nodes, for implementation of the coherence protocol, reading, sending and receiving metadata and the interfaces for local memories and file systems and to the network.

In particular therefore the service defines an interface between an application program and the coherence net.

In that respect the service may also be a part of an application program for the respective data objects.

In accordance with an embodiment the net on which the overlay network is based can be the Internet and the overlay network can in that case also use the Internet protocol. In that way it is possible to have recourse to widespread standards and the complication and expenditure for the production of a suitable service program is reduced thereby.

In that respect in accordance with an embodiment the communication can be effected in accordance with the SIP (session initiation protocol) or http standard.

The invention can be used in particular for data objects which respectively represent a complete data object under at least one application, in contrast to cache lines which generally contain only fractions or, at any event, parts of a data object which cannot be handled by a specific application. Examples of such complete data objects are text documents, graphics, tables, audio data files, film data files, stream segments, software programs, subprograms and program routines, and other data objects which are respectively handled by an application installed on a node above the operating system level.

In addition, the use of the present invention is intended in particular for applications which define at least one sequential form of representation for the data object, which is generally necessary to be able to transmit the data object by way of the net.

In accordance with an embodiment the use of the method according to the invention is intended for applications which exchange the data objects in the Java, .NET or XML format.

A configuration of the method according to the invention further provides that each instance of a data object contains references to all nodes which in turn hold an instance of that data object. That makes it possible, upon each local call-up of the data object, for all nodes to be automatically supplied with the corresponding metadata which in turn hold an instance of a data object, thereby ensuring that each node is informed about a call-up of the data object on another node.

In accordance with a development of the invention, in particular, a data object identified as a coherence object can be produced, which substantially comprises a list of data objects of an application, which are held in readiness on the nodes.

In addition, an embodiment can provide that a data object is a list of nodes for which coherence objects are held in readiness on the nodes under an application.

As already mentioned it is desirable that, when starting an application or when calling up a data object to be kept coherent, by an application, automatic enquiry of the other available nodes is effected from the list of nodes, in accordance with the current coherent instance of the data object.

The coherence protocol can include, in particular, the MESI protocol without, however, being restricted thereto.

It is also desirable if the data objects or the instances of the data objects are uniquely characterised by an identification.

In particular, the identification of the instance of a data object, beside its above-mentioned unique identifier, could also include its storage location.

The identification of the instance of a data object can also contain the node name of the net element on which it is held, and an object name. In addition, the identification of the object can include the name of the associated application and/or the moment in time of the last change (writing process) of the object. That affords solely from the identification of a data object, the answer to the question relating to the most up-to-date version and the current storage location so that any other node can determine solely from the identification of the data object, which of the instances in question it can directly call up or load, when required.

In accordance with an embodiment of the present invention it is provided that a coherence node is associated with each coherence agent, wherein the coherence nodes form an overlay network and the coherence agent is arranged logically between an application and a local memory interface and forms an interface in relation to the network. In that respect that interface to the network can also be an indirect interface in which the coherence agent is also connected to the network by way of an interposed coherence node, in which case the coherence node has a coherence agent interface, a net interface, a coherence control logic, and a coherence cache.

In that respect the coherence node can be installed locally on the computer of the coherence agent, on a remote computer in the network and, in particular, also on a network node of a carrier or provider.

BRIEF DESCRIPTION OF THE DRAWING

Further advantages, features, and possible uses of embodiments the present invention will be clearly apparent from the following detailed description, when read in conjunction with the accompanying drawing, in which.

DETAILED DESCRIPTION OF EMBODIMENTS OF THE INVENTION

An Embodiment

Consider the situation where a group of persons wish to jointly look after items of information in a document. The persons belong, for example, to various corporations, work in separate, mutually independent (local) networks and cannot access a common central file server and also there is not a common memory or memory address space. Nonetheless the items of information which are brought together are to be entered in a common document, in this case let it be an Excel table.

The procedure which is common in the state of the art in such cases involves the persons sending each other the document by e-mail. As soon as a person has made a change and would like to communicate the same, that person sends the document to the other persons. Possibly the person who would like to make the change ensures that he or she still has the most up-to-date version by asking the other persons whether they have made changes which have not yet been despatched. That query is also required if one of the persons would like to only read the document but wishes to be certain that this document is the up-to-date version.

In that way the coherence of the individual copies of the Excel table is not systematically ensured but has to be effected manually prior to and after reading and writing operations, by the persons operating the system.

The coherence service described hereinafter ensures coherence between all copies (the so-called instances) of the Excel table (the so-called coherence object) without the co-operating persons having to manually send data files. Described here are a number of variants which differ by way of increasing functionality but also by increasing architectural complexity but which respectively ensure coherence between the copies of the Excel data files.

Variant 1—The Coherence File System

Each of the co-operating persons loads a special software, for example, from a website on which applications which use the coherence service are offered and installs the software on their local computer. In this example that application is the so-called coherence file system. That provides the usual functionalities of a file system, in particular for writing and reading data files, organized in directory trees, with the particularity that the individual local instances of the coherence file system compare each other together to embody a coherent data file stock. On Windows computers the coherence file system is linked to a drive letter, on UNIX computers it is linked to a so-called mount point, while in other environments there are corresponding mechanisms.

From the point of view of the above-described Excel user, in particular, the Excel table must be stored on that coherence file system, that is to say, under the corresponding drive letter or mount point. Thereupon the user can read and write the Excel data file and can be sure that both that person and also that person's peers are working on up-to-date data.

Components and Interfaces

The coherence file system is embodied by an application-specific coherence agent which in turn uses the coherence net. Any other application is in turn embodied by a dedicated agent.

Figure 1:
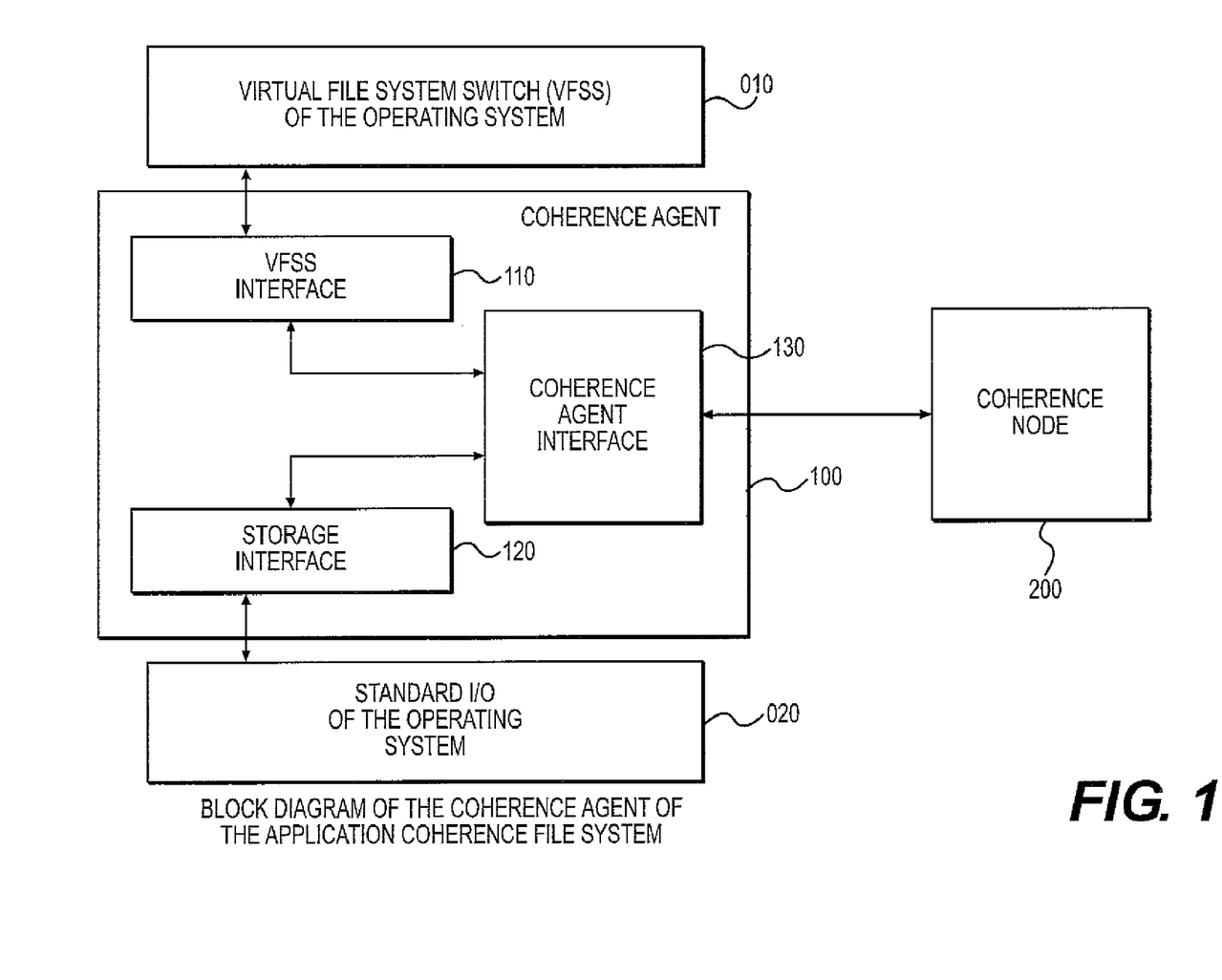
FIG. 1 is a block diagram of a coherence agent in accordance with an embodiment of the present invention.

The coherence agent 100 has three interfaces (see FIG. 1).

1. The VFSS interface 110 connects the agent to the virtual file system switch 010 of a Windows or UNIX system, just as is also implemented by local file systems such as NTFS and UFS or by network file systems and protocols such as Samba/SMB or NFS. Thus the coherence file system can be used by any application program which operates by way of standard I/O 020.

2. The storage interface 120 connects the agent to a local standard file system of the computer, for example, a directory or a partition under NTFS or UFS. In that way the coherence file system can also actually store data files.

3. The coherence agent interface 130 connects the agent 100 to a coherence node 200 of the coherence net, Any other agent of the coherence file system is also connected to such a coherence node.

FIG. 1 shows how the coherence file system interrupts the direct communication between the (unmodified) application, linked by way of the VFSS interface, and the (unmodified) local file system, linked by way of the storage interface. Instead the communication is diverted by way of the coherence interface 130. By virtue of that diversion, by communication by way of the coherence nodes with other coherence agents, it is possible to implement and ensure that exclusively coherent copies of a file, here an Excel table, are read and written.

Figure 2:
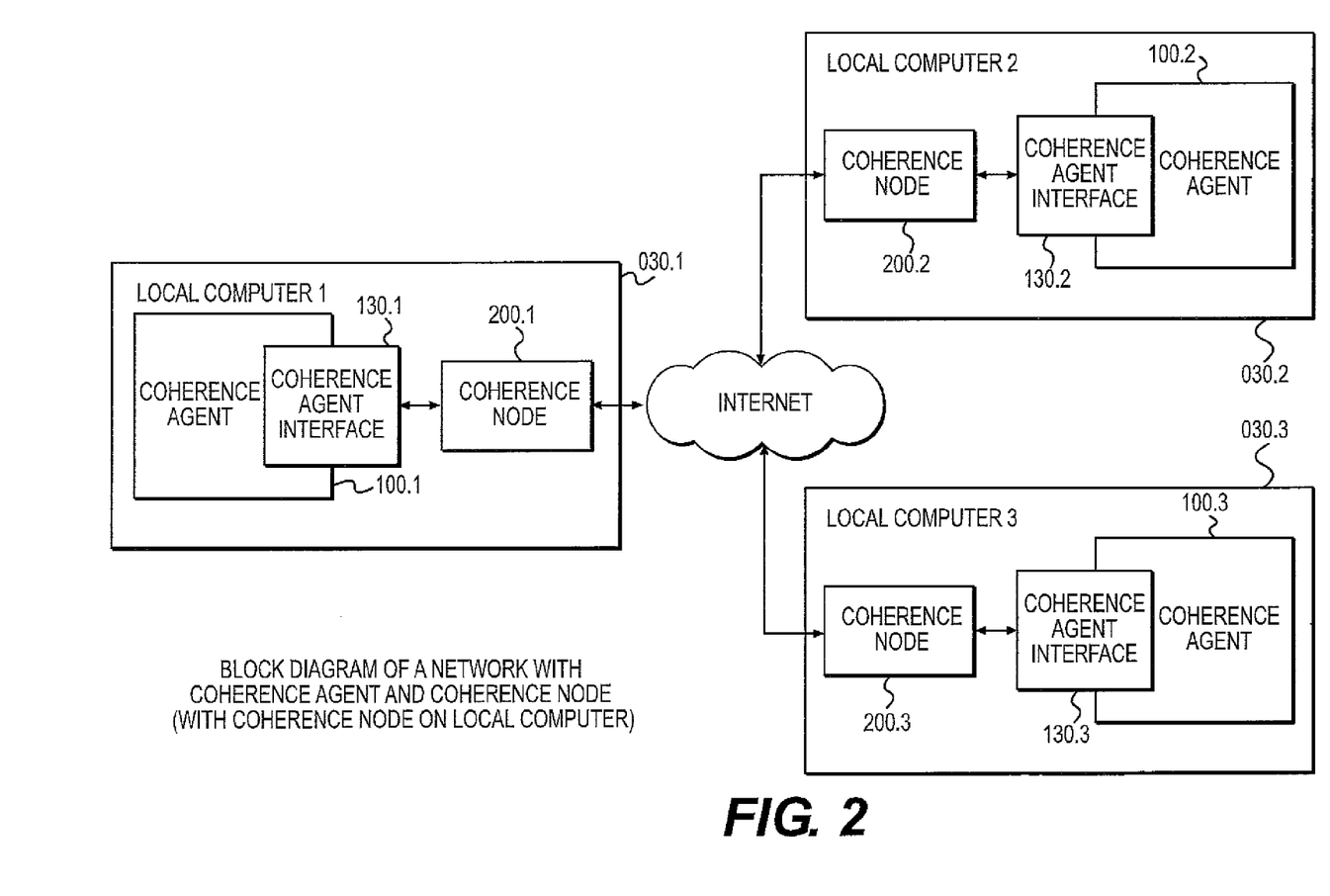
FIG. 2 is a block diagram of a network with coherence agents and coherence nodes in accordance with an embodiment of the present invention.

A number of variations are possible for placement of the coherence nodes in terms of net technology. That property is referred to as "coherence granularity":

1. The coherence nodes can be installed locally on the computers of the users see (FIG. 2). Such a local coherence node implements coherence only for the objects of a user and allows the construction of coherent applications without involvement of a telecommunication provider or carrier.

Figure 3:
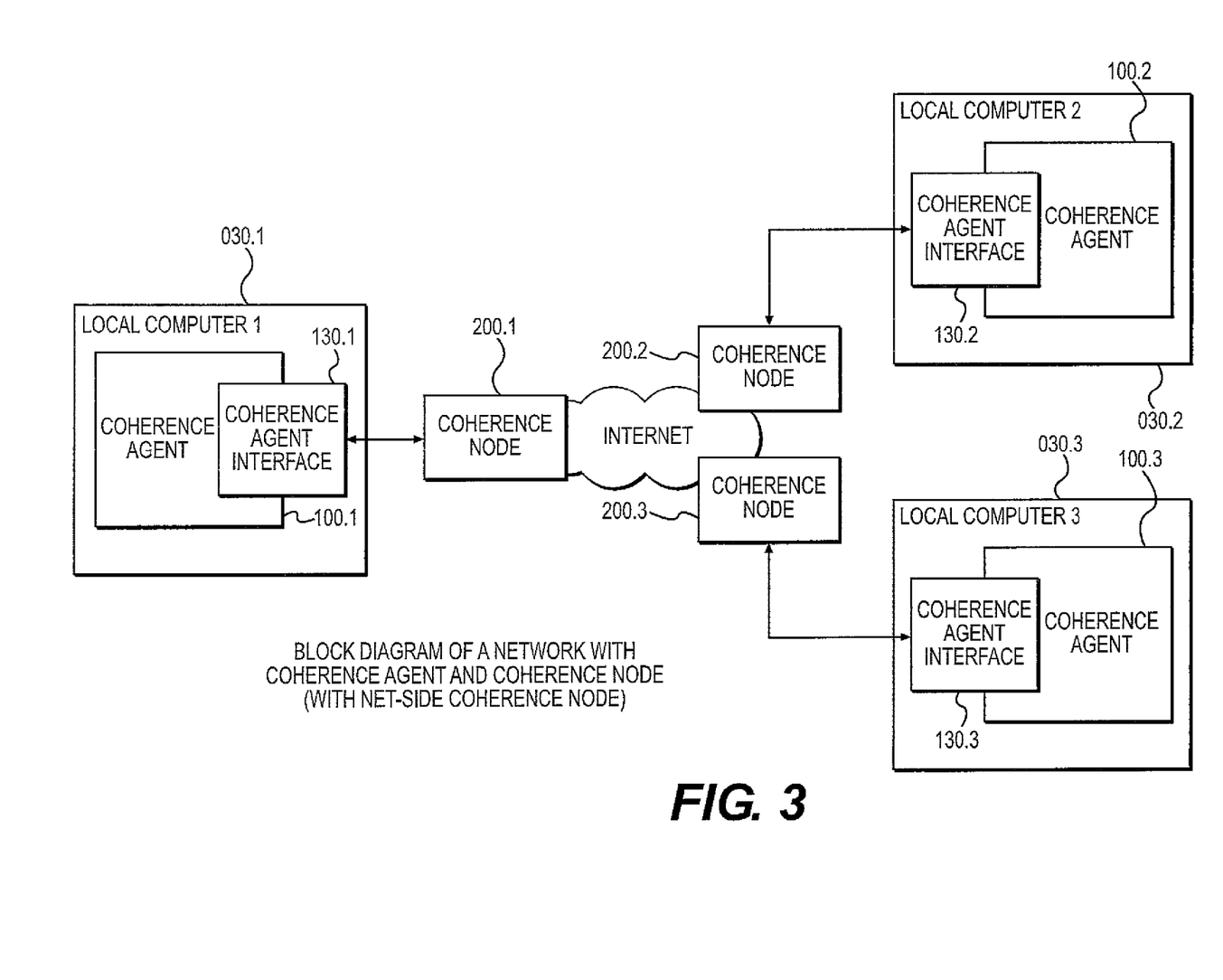
FIG. 3 is a block diagram similar to FIG. 2 but with non-local coherence nodes.

2. The coherence nodes can be implemented at the net side, for example, as part of the Internet (see FIG. 3). Typically such topologies can be adopted by telecommunication providers or carriers for optimization of communication efficiency, for example, on the basis of geographical proximity or other good connection.

Extreme or hybrid forms are also possible. For example, coherence nodes can be constructed, dedicated for individual applications, or in the LAN of an undertaking can only provide a department with coherence. It is possible for the coherence granularity for each individual coherence node to be separately established.

Mode of Operation—Loading

In ongoing operation the user can simply load his documents and in so doing be certain that he has opened the most up-to-date version.

Process with Local Demand

The following is a description of the process in a coherence agent 100 when the application performs an operation. In this example the application is the coherence file system and the interface to the coherence agent is the virtual file system switch 010 of the operating system. Therefore the operations for all operating systems are known in the state of the art. Consider now the operation of opening a data file. That operation, as a parameter, bears a file name, typically inclusive of a file path in a directory structure, and is unique as such; the totality is defined as the 'file name' (see FIG. 6). With that file name as the object identifier 215, in this example the coherence agent interface 130 of the coherence agent 100 (see FIG. 1) calls up the method GET 211 (FIG. 6) of the coherence node 200 (FIG. 1). The object identifier is part of the metadata.

Figure 4:
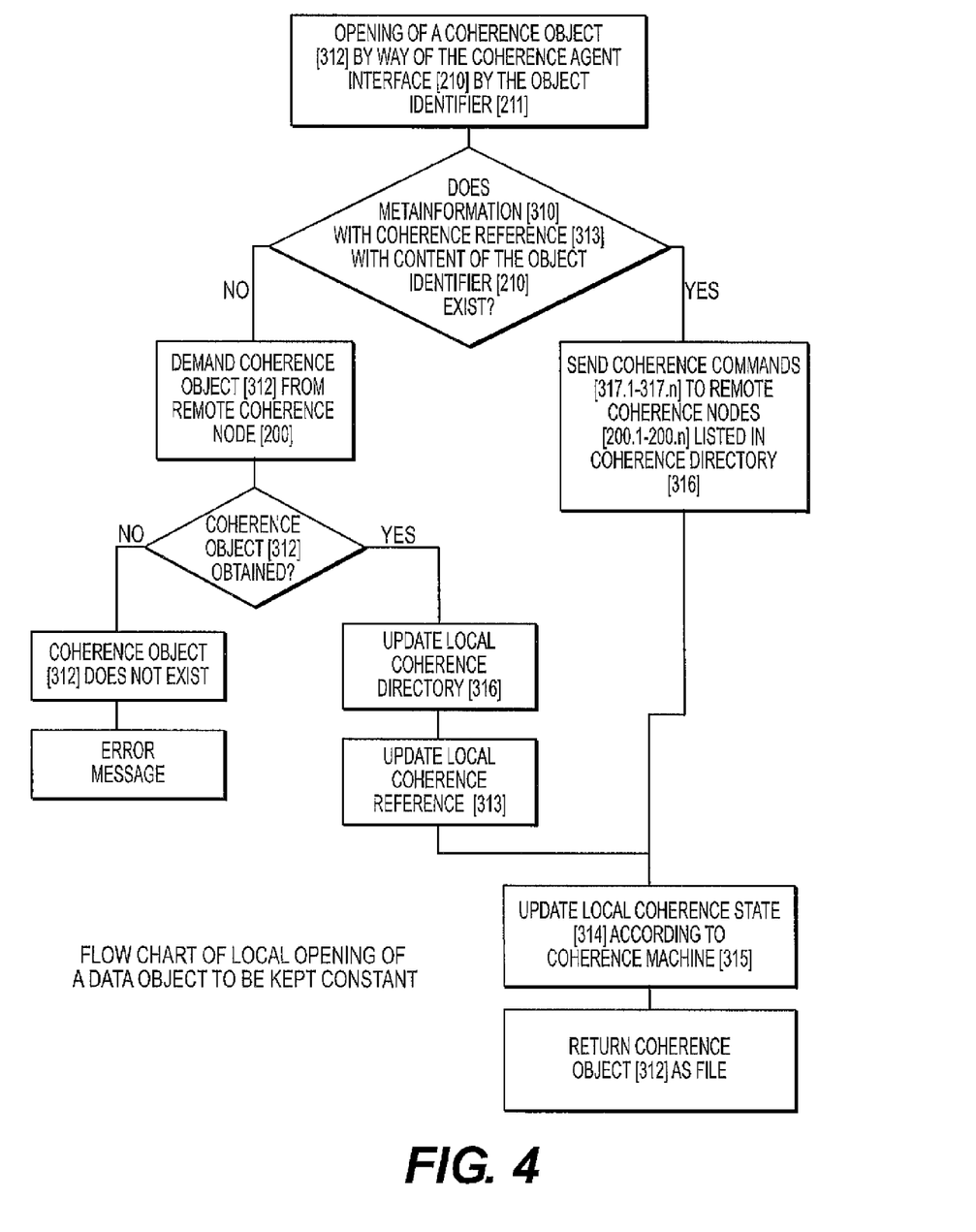
FIG. 4 is a flow chart of the local opening of a data object to be kept coherent with the corresponding processes in a local coherence node in accordance with an embodiment of the present invention.
Figure 5:
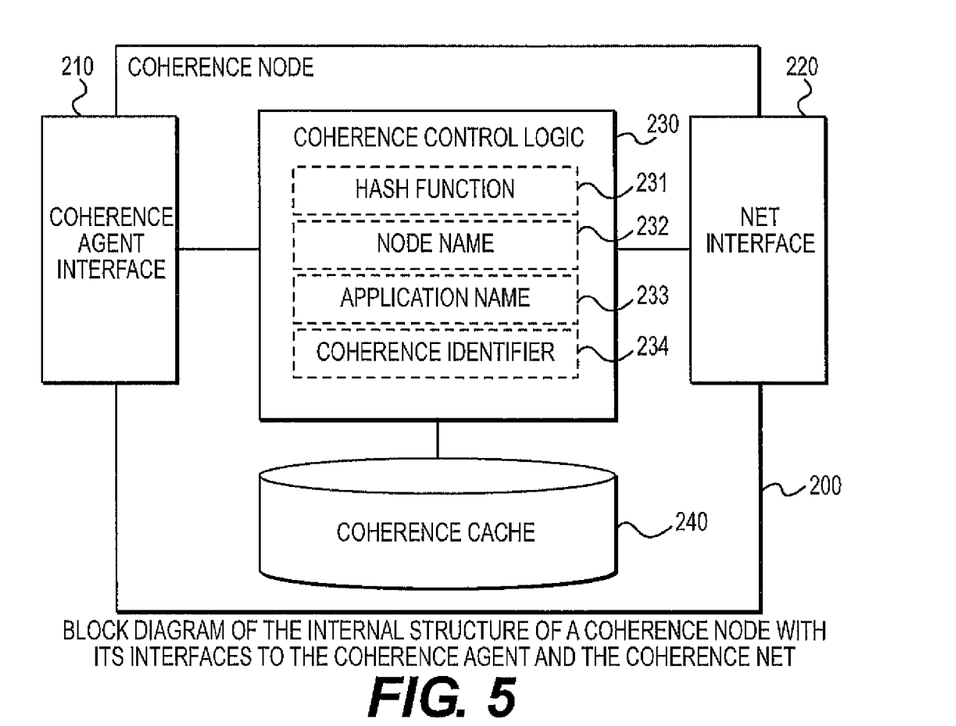
FIG. 5 is a diagrammatic view of a coherence node as may be employed in the embodiments of FIGS. 2 and 3.
Figure 8:
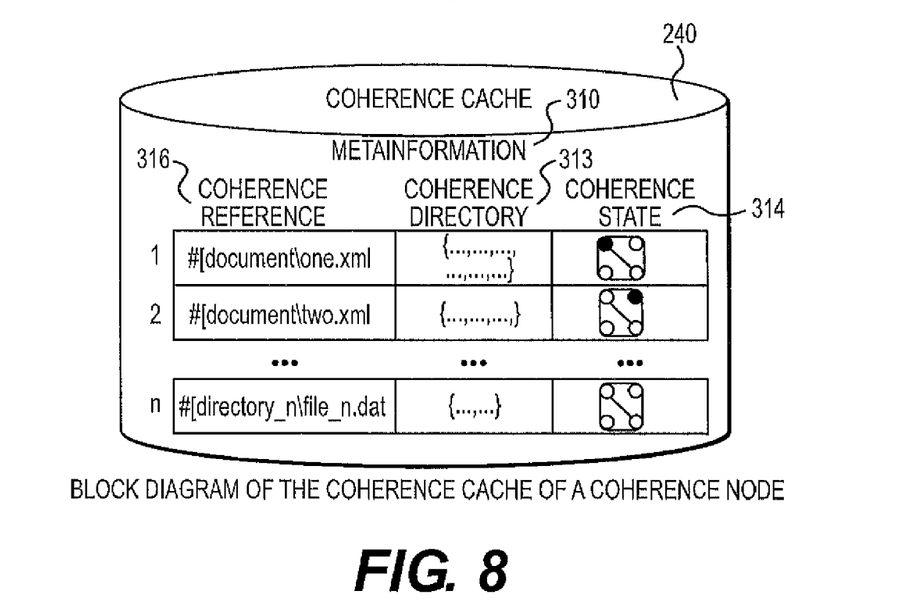
FIG. 8 is a diagrammatic view of a coherence cache belonging to a coherence node in accordance with embodiments of the invention.

FIG. 4 shows the process in a coherence node 200 (FIG. 1) when, by way of the coherence agent interface 210 (FIG. 5), a call-up of one of the four methods 211-214 (FIG. 6) of that interface 210 is effected: in this example the method GET 211 (FIG. 6) is called up with an object identifier 215. That object identifier is reproduced by way of the hash function 231 (FIG. 5) of the coherence control logic 230 on to a coherence reference 316 (FIG. 8). By virtue of the association of the object identifier 215 and the hash function 231, the node name 232, the application name 233, the coherence identifier 234, and the items of metainformation 310 (FIG. 8) with the objects, in this embodiment the metadata are uniquely generated and associated. The coherence control logic 230 (FIG. 5) checks whether such a coherence reference 316 (see FIG. 8) is contained in the items of metainformation 310 of the coherence cache 240 (FIG. 5).

For further explanation, the items of coherence metainformation 310 (FIG. 8) within the coherence cache 240 (FIG. 5) of the coherence node 200 (FIG. 1) comprise three parts, as shown in FIG. 8:

1. The coherence reference 316 is a key which is unique within the coherence cache 240 to a coherence object of the coherence agent. The reference is formed by a hash function 231 of the coherence control logic 230 from an object identifier 215.

2. The coherence directory 313 to a coherence reference 316 contains a list of those other coherence nodes (200.2 and 200.3 in FIG. 3), which store instances of the coherence object referenced by 316. Thus the directory 313 defines the respective up-to-date topology of the limitation of object instances. The use of directory-based coherence corresponds to the state of the art.

3. The coherence state 314 is one of the states corresponding to a state machine, the so-called coherence machine. The coherence machines of individual nodes change their states coherently in accordance with a synchronisation process, the so-called coherence protocol. Such protocols correspond to the state of the art; a known example of such a protocol is the MESI protocol.

Figure 6:
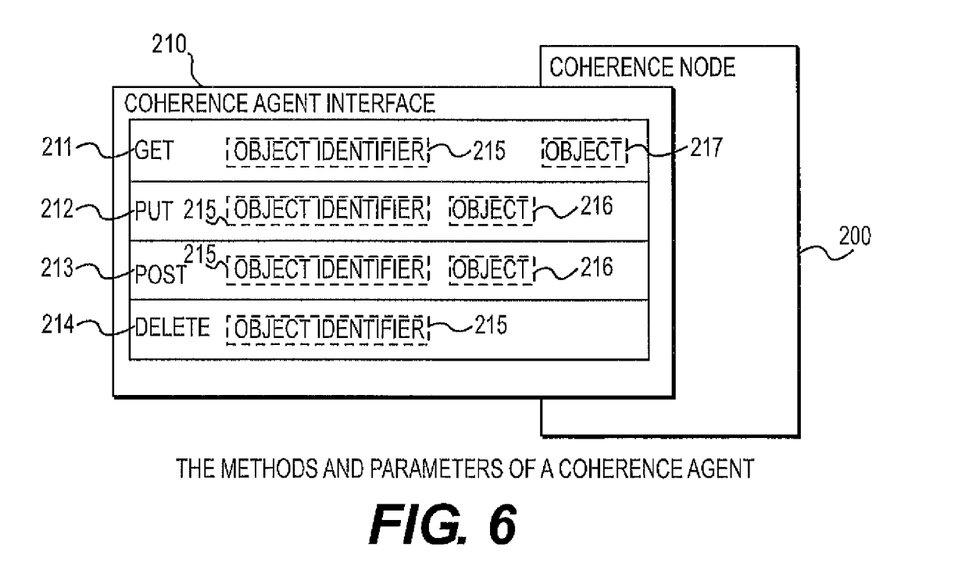
FIG. 6 shows methods and parameters of a coherence agent of the type that may be employed with the described embodiments of the invention.

When such an entry with appropriate reference 316 is present, the coherence control logic 230 checks whether the associated coherence state 314 has a value of valid coherence:

Either: if the object identified by reference 316 is still coherent—in the above-indicated example of the MESI protocol that would be the states M, E and S—then the method GET 211 of the interface 210 delivers an empty answer back to the calling-up agent, that is to say, an answer with an empty object 217. Thereupon the agent uses its own copy of the object—in the example of the coherence file system it loads it by way of storage interface 120 from the "normal" file system of the local computer—and delivers it to the application —in the example of the coherence file system by way of the VFSS interface 110.

Or: if the object identified by reference 316 is no longer coherent—in the above-mentioned example of the MESI protocol that would be the state I—then the coherence nodes loads a coherent copy of the coherence object out of the coherence net by a remote demand (see below) by way of the net interface 220 (FIG. 5), That copy is delivered back to the agent as the object 217 by way of the interface 210 (FIG. 6). The agent up-dates its own copy and delivers the coherent object to the application.

The procedural component involved in a local demand within the coherence mode is illustrated as a control flow chart in FIG. 4.

The concept of producing coherence with state machines and directories is admittedly state of the art, as disclosed, for example, in German patent publication DE 103 41 563 A1, but is limited to memory coupling. The present invention is based thereon and implements a coherence service for next generation networks and future Internet.

Process in Respect of Remote Demand

Figure 7:
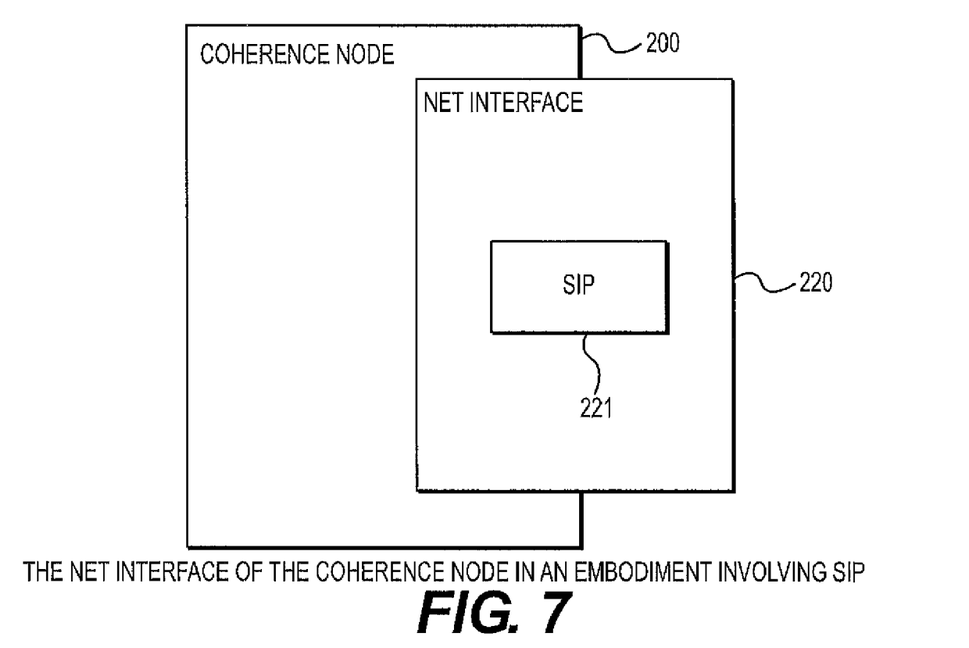
FIG. 7 shows a network interface implementing the communication between coherence nodes on the basis of SIP in accordance with embodiments of the invention.

Here follows the description of the process in a coherence node 200 when a call-up is effected by way of the net interface 220. The coherence communication is sent by way of the SIP method 221 (FIG. 7) to the net interface 220 and tunnelled by way of SIP as a transport layer; SIP (session initialisation protocol) is known to persons skilled in the art in this field and is specified in RFC 3261. Use of the SIP infrastructure of the net such as, for example, the IMS (internet multimedia subsystem) ensures addressing and attainability of remote coherence nodes even in relation to mobile users and security measures such as firewalls and at the same time ensures good performance in transport by way of the IP net. The specific expression of the coherence communication is coded in the fields "content-type" and the SDP description by way of 'c='-connection and 'a='-attribute fields. The SDP (session description protocol) is specified in RFC 2327.

The process component in relation to remote demand within a coherence node takes place similarly to local demand and is known per se in that respect. In the present case however there is a particularity of the present invention. The relevant remote node is established as follows: the coherence reference 316 is generated from the object identifier 215 by way of the hash function 231 and the coherence identifier 234 which is unique over the entire coherence net generated by way of the node name 232 and application name 233 of the control logic 230. In accordance with an embodiment this has the structure:

coherenee://sipserver//application/path/name

In that case sipserver is the node name as the SIP address, application is the application name and path/name is the coherence reference 316.

Similarly to signalling of the coherence protocol by way of SIP, transport of the coherence objects to be transmitted from node to node occurs within the media session negotiated by the SIP handshake by way of RTP; realtime transport protocol is specified in RFC 3550.

To sum up, SIP-based coherence is made available by way of the Internet. That is not similar to parallel computers and distinguishes embodiments of the present invention over the state of the art.

Mode of Operation—Storage

As soon as the user stores his file again, it is ensured that all other users (and he or she himself or herself) receive in an open condition in the next loading of the file, that version which is therefore most up-to-date. The processes upon storage take place similarly to loading between coherence agent 100 and coherence node 200.

In the example of the coherence file system, locking scenarios occur due to the known standard operations on files in such a way that, for example, only the first user can open files for reading and writing, but further users can only open the files for reading so that no inconsistencies are formed.

Mode of Operation—Initialization

The individual coherence agents are connected together by way of the coherence net, in the above-indicated example (see FIG. 3) comprising the specified three subscribers. That coherence net comprises excellent net elements, namely, the coherence nodes which are connected to the coherence agents and other coherence nodes, and arrange and transport the coherence traffic. The user of the coherence agent, for example the coherence file system, attends to a list with the other users with whom he would like to jointly work on documents. Those kinds of access control correspond to usual access control on file systems and central file servers.

Variant 2—Active Documents

More highly specialized implementations allow even better methods which keep the documents coherent during simultaneous processing by a plurality of persons. Coherence plugins in applications suitable for that purpose such as the Microsoft Office applications, with their capability of embedding DCOM servers, allow the documents, as so-called active coherence documents, to keep the common inputs coherent instantaneously and without separate storage processes. Thus, in an Excel table, coherence can be improved at cell level.

What is claimed is:

1. A method of providing coherence between instances of data objects residing on distributed nodes of a non memory-coupled network, the method comprising:
processing a data object by a node;
generating platform-independent unique metadata for each instance of a so processed data object;
operating a coherence protocol on said metadata; and
keeping the metadata and thus the data object coherent by means of said metadata and said coherence protocol:
wherein the nodes using the coherence protocol form an overlay network; and
wherein there is provided a service which defines the overlay network and which allows a demand and communication of data objects between at least a part of the nodes of the overlay network.

2. The method as set forth in claim 1, wherein the metadata contains a state machine corresponding to the coherence protocol.

3. The method as set forth in claim 2, wherein state transitions of the state machine and the associated operations performed on the data objects are communicated by the coherence protocol at least between all nodes of the network that hold an instance of the respective data object.

4. The method as set forth in claim 3, wherein each instance of a data object contains references to all nodes which in turn hold an instance of said data object.

5. A program for providing coherence between instances of data objects residing on distributed nodes of a non memory-coupled network, the program being adapted to execute a method as set forth in claim 3.

6. A data carrier configured to carry a program as set forth in claim 5.

7. The method as set forth in claim 2, wherein each instance of a data object contains references to all nodes which in turn hold an instance of said data object.

8. A program for providing coherence between instances of data objects residing on distributed nodes of a non memory-coupled network, the program being adapted to execute a method as set forth in claim 2.

9. A data carrier configured to carry a program as set forth in claim 8.

10. The method as set forth in claim 1, wherein each instance of a data object contains references to all nodes which in turn hold an instance of said data object.

11. The method as set forth in claim 1, wherein for each data object there is provided a coherence object which is a list of the data objects of an application that are held ready on the nodes.

12. The method as set forth in claim 1, wherein the service is a part of an application program for the data objects.

13. The method as set forth in claim 1, wherein the service defines an interface between a node and the network.

14. The method as set forth in claim 1, wherein the net on which the overlay network is based uses the Internet protocol.

15. The method as set forth in claim 1, wherein the coherence protocol implements a communication using the session initiation protocol (SIP) standard or the http standard.

16. The method as set forth in claim 1, wherein the data object is respectively a complete data object under at least one application.

17. The method as set forth in claim 1, wherein the application for the data object defines at least one sequential representation form.

18. The method as set forth in claim 1, wherein the data objects are selected from the group consisting of Java, .NET, COM, and XML objects.

19. The method as set forth in claim 1, wherein upon each call-up of a data object, which is to be kept coherent by an application of an automatic query of the other available nodes of the network from the list of the coherence object, is effected in accordance with the current coherent instance of the data object.

20. The method as set forth in claim 1, wherein the coherence protocol includes an invalidating protocol selected from the group consisting of MSI, MOSI, MESI, MOESI, or update based protocol SYNAPSE or DRAGON.

21. The method as set forth in claim 1, wherein the identification of the instance of a data object beside the protocol data also includes its memory location.

22. The method as set forth in claim 1, wherein the identification of the data object is unique.

23. The method as set forth in claim 1, wherein the identification of the data object contains the node name of the net element on which it is held and an object name.

24. The method as set forth in claim 1, wherein the identification of the instance of the data object includes the name of the associated application.

25. The method as set forth in claim 1, wherein the identification of the instance of the data object includes the time of the last change.

26. The method as set forth in claim 1, wherein the application for the data object provides a direct communication between a plurality of nodes which simultaneously modify a respective instance of the same data object.

27. The method as set forth in claim 1, wherein the data object is selected from at least one of the following objects: text document, graphics, table, audio file, video file, stream segment, element of a software program, or subprogram.

28. The method as set forth in claim 1, wherein each node has a coherence agent which is logically arranged between an application and a local memory interface and forms an interface to the network.

29. The method as set forth in claim 28, wherein the coherence agent is connected to the network by way of a coherence node, wherein the coherence node has a coherence agent interface, a net interface, a coherence control logic, and a coherence cache.

30. The method as set forth in claim 29, wherein the coherence node is a coherence node locally installed on the node of the coherence agent.

31. The method as set forth in claim 29, wherein the coherence node is a coherence node installed on the network or another node of the network, in particular a provider or carrier node.

32. A program for providing coherence between instances of data objects residing on distributed nodes of a non memory-coupled network, the program being adapted to execute a method as set forth in claim 1.

33. A data carrier configured to carry a program as set forth in claim 32.

* * * * *